UNITED STATES PATENT OFFICE.

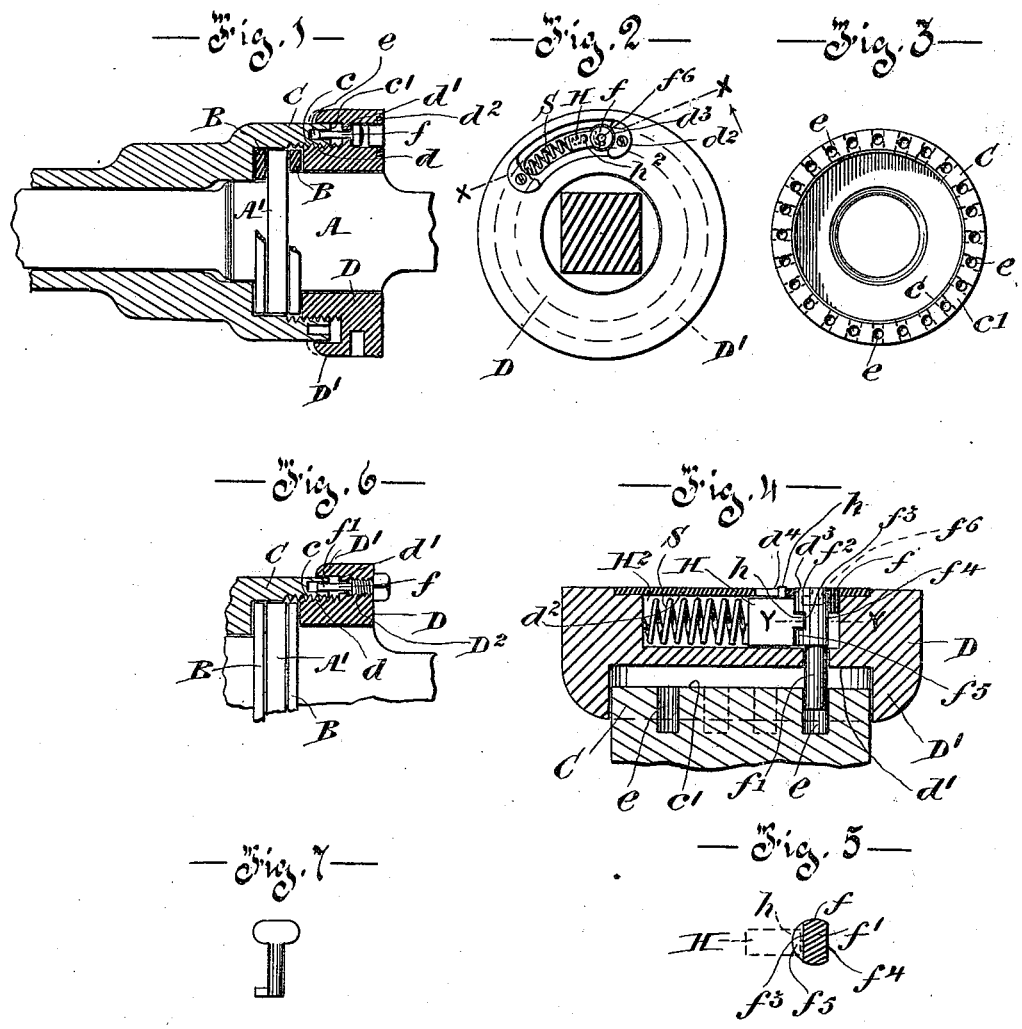

JOSEPH LEDOUX, OF MONTREAL, CANADA.

CARRIAGE-AXLE.

SPECIFICATION forming part of Letters Patent No. 512,197, dated January 2, 1894.

Application filed July 31, 1893. Serial No. 479,538. (No model.)

*To all whom it may concern:*

Be it known that I, JOSEPH LEDOUX, of the city of Montreal, in the district of Montreal and Province of Quebec, Canada, have invented certain new and useful Improvements in Carriage-Axles; and I do hereby declare that the following is a full, clear, and exact description of the same.

This invention relates to and provides means for taking up the slack occasioned by the wearing of the washers at the inner end of the journal and it may be said to consist of a series of engaging points or recesses formed in the rear face of the usual axle box and a pin or projection from the contiguous face of the usual dust guard sleeve entering such recesses, which sleeve has, as usual, a screw thread connection with the inner end of said axle box, the intention being that as the washers on either side of the journal collar become worn the sleeve is released by the temporary withdrawal of the pin and rotated a point in the direction required to tighten up the parts again. For full comprehension however of the invention, reference must be had to the annexed drawings forming a part of this specification in which like symbols indicate corresponding parts and wherein—

Figure 1 is a longitudinal vertical section through a portion of the axle box, the washers and dust guard sleeve, a portion of the journal and axle proper being shown in elevation. Fig. 2 is an outside face view of the dust guard sleeve with a detachable cover for the pin carried thereby, partially broken away. Fig. 3 is an inner end view of the axle box showing the engaging points or recesses for the pin on the dust guard sleeve. Fig. 4 is an enlarged section on line $x\ x$ Fig. 2; Fig. 5 a section through pin on line $Y\ Y$ Fig. 4. Fig. 6 is a detail part longitudinal section of a modified form of pin projection and Fig. 7 a detail view of key used for turning and drawing out the pin.

A is the journal of the axle, A' the usual collar or flange thereon, B B the usual washers located either side of such collar, and C the inner end of the axle box which overlaps and projects some distance inward beyond such collar and washers, and is screw-threaded on its inside periphery as shown at $c$.

D is the dust guard sleeve in rear of the parts just mentioned, having a hub portion screw threaded at $d$ to correspond with and take into the screw thread $c$ and also having a lateral flange D' overlapping the periphery of the inner end of the box C.

The inner or rear face $c'$ of the box C has what I may term a series of engaging points $e$ formed as notches, teeth or recesses, the latter form being shown in full and the others in dotted lines, one of which recesses receives a pin or projection $f$ from the contiguous face $d'$ of the sleeve D between the hub and flange thereof. This pin can be of various forms and be locked in a variety of ways, the simplest being, as shown in Fig. 6, a jam-screw, screwed into recess $D^2$ in sleeve D jammed in place and held by friction, only its diminished end $f'$ projecting through the face $d'$ a sufficient distance to engage with the teeth or recesses $e$ but I prefer to construct the pin $f$ with a portion of two sides of its circular head $f'$ cut away to present flat faces $f^3 f^4$, the former carrying a projection $f^5$ over which a tooth or projection $h$, in the face of a block H sliding in slot $H^2$ is located and secures the pin against lateral displacement at the same time the flat faces of the projection $h$ on block H and sides $f^3 f^4$ of pin $f$ prevent it from turning. To remove the pin all that is necessary is to turn it till the face $f^4$ comes next the block H when it is free to be drawn out, the yielding resistance S allowing the pin to be turned by a key preferably of the kind shown in Fig. 7, which is inserted in an opening $f^6$ in the head of the pin.

$d^2$ is a plate or cover let into the face of the sleeve D, its purpose being to cover up the parts for locking the pin in place and is provided with a hole $d^3$ and slot $d^4$ the former to admit of the passage of the pin through it and the latter to afford a catch or stop to prevent the sliding block H through pin $h^2$ carried by it and traveling in such slot $d^2$, from obstructing the passage of the pin $f$.

It will be readily apparent from the foregoing that as the washers B B become worn it is only necessary to remove the pin $f$, rotate the sleeve sufficiently to tighten up the parts, and again insert the pin to hold the sleeve in place, the distance between the contiguous-faces $c'$ and $d'$, respectively of the box C and sleeve D, allowing such adjustment.

What I claim is as follows:

1. In a carriage axle, the combination with the axle box provided with points of engagement in the face of its rear overlapping end and such points of engagement being inside the peripheral side of same,—of the dust guard sleeve having a screw threaded connection with the interior periphery of such rear overlapping end and perforated to carry a movable pin or projection to interlock with such points for the purposes set forth.

2. In a carriage axle, the combination with the axle box provided with points of engagement in the face of its rear overlapping end, of the dust guard sleeve having a screw threaded connection with the interior periphery of such rear overlapping end, correspondingly screw threaded, also having a face portion adjacent to that of the rear end of said box but out of contact therewith, and a lateral flange overlapping the rear end of said axle box, and adapted to be adjusted with such face portion closer to such rear end and to be locked against backward movement, with means carried by said sleeve for interlocking with said points of engagement and effecting such locking, as set forth.

3. In a carriage axle, the combination with the axle box provided with points of engagement in its rear face, of the dust guard sleeve carrying a movable pin or projection to interlock with such points, and a spring or yielding resistance device arranged laterally of such pin to hold same in its locking position as set forth.

4. The combination of the rear face $c'$ having the annular series of engaging points $e$, of the sleeve D perforated to carry the removable pin and also carrying the lateral yielding resistance locking device for the purpose set forth.

5. In a carriage axle, the combination with the axle box provided with the recesses $e$ in its rear face, of the dust guard sleeve perforated and carrying the removable pin $f$ to interlock with such recesses for the purposes set forth.

JOSEPH LEDOUX.

Witnesses:
WILL P. McFEAT,
FRED. J. SEARS.